United States Patent
Gassoway (10) Patent No.: US 8,493,972 B2
(45) Date of Patent: Jul. 23, 2013

(54) SYSTEMS AND METHODS FOR DETECTING DENIAL OF SERVICE ATTACKS

(75) Inventor: Paul Gassoway, Norwood, MA (US)

(73) Assignee: CA, Inc., Islandia, NY (US)

( * ) Notice: Subject to any disclaimer, the term of this patent is extended or adjusted under 35 U.S.C. 154(b) by 2027 days.

(21) Appl. No.: 11/132,614

(22) Filed: May 18, 2005

(65) Prior Publication Data

US 2005/0259660 A1 Nov. 24, 2005

Related U.S. Application Data

(60) Provisional application No. 60/572,683, filed on May 20, 2004.

(51) Int. Cl.
*H04L 12/28* (2006.01)

(52) U.S. Cl.
USPC ............................. 370/389; 370/394

(58) Field of Classification Search
USPC ........................................ 370/394
See application file for complete search history.

(56) References Cited

U.S. PATENT DOCUMENTS

| | | | |
|---|---|---|---|
| 6,978,384 B1 * | 12/2005 | Milliken | 726/26 |
| 7,188,366 B2 * | 3/2007 | Chen et al. | 726/23 |
| 2003/0018912 A1 * | 1/2003 | Boyle et al. | 713/201 |
| 2003/0110394 A1 * | 6/2003 | Sharp et al. | 713/200 |
| 2004/0013112 A1 * | 1/2004 | Goldberg et al. | 370/389 |
| 2004/0158725 A1 * | 8/2004 | Szor | 713/188 |
| 2005/0216954 A1 * | 9/2005 | Ramaiah et al. | 726/22 |

FOREIGN PATENT DOCUMENTS

| WO | WO 01/82548 A2 | 11/2001 |
|---|---|---|
| WO | WO 03/073724 A2 | 9/2003 |

OTHER PUBLICATIONS

Notification of Transmittal of the International Search Report for application PCT/US2005/017445 (7 pages), Sep. 21, 2005.
Written Opinion of the International Searching Authority for application PCT/US2005/017445 (5 pages), Sep. 21, 2005.
XP-001027371 DOD Standard Transmission Control Protocol; by Information Sciences Institute, University of Southern California, 78 pages, Jan. 1980.
XP-002342752 Strange Attractors and TCP/IP Sequence Number Analysis; Author: Michael Zalewski; 39 pages, 2001.

* cited by examiner

*Primary Examiner* — John Blanton
(74) *Attorney, Agent, or Firm* — Baker Botts, LLP (57) ABSTRACT

A method for detecting malicious packets includes comparing a sequence number of an input packet with sequence numbers of one or more previously input packets and detecting a malicious packet when the sequence number of the input packet matches at least one of the sequence numbers of the previously input packets.

19 Claims, 6 Drawing Sheets

FIG. 1

| Source Port 101 | | Destination Port 102 | |
|---|---|---|---|
| Sequence Number 103 | | | |
| Acknowledgment Number 104 | | | |
| Data Offset 105 | Reserved 106 | U A P R S F<br>R C S S Y I<br>G K H Y N N 107 | Window 108 |
| Checksum 109 | | Urgent Pointer 110 | |
| Options 111 | | | Padding 112 |
| Data 113 | | | |

| |
|---|
| 2F892BC1 |
| 8DD5A90E |
| C602BE22 |
| 792D2EBA |
| 2DE0897C |
| E2E96CF4 |

SYSTEMS AND METHODS FOR DETECTING DENIAL OF SERVICE ATTACKS

REFERENCE TO RELATED APPLICATION

This application is based on and claims the benefit of Provisional Application Ser. No. 60/572,683 filed May 20, 2004, the entire contents of which are herein incorporated by reference.

BACKGROUND

1. Technical Field

The present disclosure relates to denial of service attacks and, more specifically, to systems and methods for detecting denial of service attacks.

2. Description of the Related Art

Computer systems and computer networks are commonly used by corporations and institutions to store and manage sensitive information. Additionally, computer systems and networks are often used to provide the constituents of corporations and institutions with around-the-clock access to information and services through the use of websites and related web-based services.

While the use of such systems and networks has many advantages, these systems and networks present a risk to corporations and institutions that their systems and networks can be exploited or vandalized by malicious attack. Malicious attacks can be attempts by individuals to willfully and/or maliciously exploit and/or damage the public or private systems and networks of others. Malicious attacks may be launched by individuals wishing to do harm or by unscrupulous competitors desiring a competitive advantage. Malicious attacks can potentially compromise sensitive data, damage software and/or hardware, tie up valuable network resources and disrupt the availability of websites and related web-based services.

One particularly popular form of malicious attack is the denial of service attack. The denial of service attack is a broad term used to describe malicious attacks that attempt to disrupt the service of websites and related web-based services generally by bogging down targeted servers with a barrage of bogus requests for information. There can be many forms of denial of service attacks. Examples of denial of service attacks include buffer overflow attacks, the SYN Attack, the Teardrop attack and the Smurf attack.

The buffer overflow attack is among the most common forms of denial of service attack. This attack attempts to send a server more network traffic than it has been designed to accept. Network traffic can be data that is sent to a server by a system or user wishing to establish a communication connection. Network traffic can be data that is transmitted during the course of communication. Servers, such as web servers and email servers, often use a data buffer to temporarily store traffic that is received while the server is busy processing other traffic. Data buffers have a limited capacity that can be selected based on the volume of traffic that the server has been designed to accommodate. By sending a barrage of network traffic to a server, the server's data buffer can overflow. When a data buffer overflows, the data buffer may become incapable of receiving additional traffic because there may not be additional free space to accommodate the traffic. Traffic that is sent to a server with an overflowing data buffer may not be accepted and the server may therefore not be in a usable state.

Buffer overflow attacks may additionally exploit weaknesses in the system targeted to increase the effectiveness of the attack. Such attacks may simply send a value that is larger than the target server is prepared to accommodate. Because servers are generally designed to function correctly even when presented with values that are too large, creating a buffer overflow of this nature involves exploiting a specific weakness in the server being targeted. For example, buffer overflow attacks may send email messages to the target server that contain attachments with 256-character file names thereby exploiting a weakness that has been identified in certain email servers and more easily causing a buffer overflow. Other email servers can be vulnerable to emails that have been addressed to an email address exceeding 256 characters.

The use of such denial of service attacks is wide spread and may be growing and the threat posed by such attacks is large. An efficient and effective way of protecting computer systems and networks from this growing threat is highly desirable.

SUMMARY

A method for detecting malicious packets includes comparing a sequence number of an input packet with sequence numbers of one or more previously input packets and detecting a malicious packet when said sequence number of said input packet matches at least one of said sequence numbers of said one or more previously input packets.

A method for detecting malicious packets includes comparing an acknowledgment number of an input packet with acknowledgment numbers of one or more previously input packets and detecting a malicious packet when said acknowledgment number of said input packet matches at least one of said acknowledgment numbers of said previously input packets.

A method for detecting malicious packets includes comparing a sequence number of an input packet with sequence numbers of one or more previously input packets, comparing an acknowledgment number of said input packet with acknowledgment numbers of said one or more previously input packets and detecting a malicious packet when said sequence number of said input packet matches at least one of said sequence numbers of said previously input packets and/or said acknowledgement number of said input packet matches at least one of said acknowledgement numbers of said previously input packets.

A system for detecting malicious packets includes a comparing unit for comparing a sequence number of an input packet with sequence numbers of one or more previously input packets and a detecting unit for detecting a malicious packet when said sequence number of said input packet matches at least one of said sequence numbers of said previously input packets.

A system for detecting malicious packets includes a comparing unit for comparing an acknowledgment number of an input packet with acknowledgment numbers of one or more previously input packets and a detecting unit for detecting a malicious packet when said acknowledgment number of said input packet matches at least one of said acknowledgment numbers of said previously input packets.

A system for detecting malicious packets includes a sequence number-comparing unit for comparing a sequence number of an input packet with sequence numbers of one or more previously input packets, an acknowledgment number-comparing unit for comparing an acknowledgment number of said input packet with acknowledgment numbers of said one or more previously input packets and a detecting unit for detecting a malicious packet when either said sequence number of said input packet matches at least one of said sequence numbers of said previously input packets and/or said acknowledgement number of said input packet matches at least one of said acknowledgement numbers of said previously input packets.

A computer system includes a processor and a computer recording medium including computer executable code executable by the processor for detecting malicious packets. The computer executable code includes code for comparing a sequence number of an input packet with sequence numbers of one or more previously input packets and code for detecting a malicious packet when said sequence number of said input packet matches at least one of said sequence numbers of said previously input packets.

A computer system includes a processor and a computer recording medium including computer executable code executable by the processor for detecting malicious packets. The computer executable code includes code for comparing an acknowledgment number of an input packet with acknowledgment numbers of one or more previously input packets and code for detecting a malicious packet when said acknowledgment number of said input packet matches at least one of said acknowledgment numbers of said previously input packets.

A computer system includes a processor and a computer recording medium including computer executable code executable by the processor for detecting malicious packets. The computer executable code includes code for comparing a sequence number of an input packet with sequence numbers of one or more previously input packets, code for comparing an acknowledgment number of said input packet with acknowledgment numbers of said one or more previously input packets and code for detecting a malicious packet when said sequence number of said input packet matches at least one of said sequence numbers of said previously input packets and/or said acknowledgement number of said input packet matches at least one of said acknowledgement numbers of said previously input packets.

A computer recording medium including computer executable code for detecting malicious packets, includes code for comparing a sequence number of an input packet with sequence numbers of one or more previously input packets and code for detecting a malicious packet when said sequence number of said input packet matches at least one of said sequence numbers of said one or more previously input packets.

A computer recording medium including computer executable code for detecting malicious packets, includes code for comparing an acknowledgment number of an input packet with acknowledgment numbers of one or more previously input packets and code for detecting a malicious packet when said acknowledgment number of said input packet matches at least one of said acknowledgment numbers of said previously input packets.

A computer recording medium including computer executable code for detecting malicious packets, includes code for comparing a sequence number of an input packet with sequence numbers of one or more previously input packets, code for comparing an acknowledgment number of said input packet with acknowledgment numbers of said one or more previously input packets and code for detecting a malicious packet when said sequence number of said input packet matches at least one of said sequence numbers of said previously input packets and/or said acknowledgement number of said input packet matches at least one of said acknowledgement numbers of said previously input packets.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing the preferred embodiments of the present disclosure illustrated in the drawings, specific terminology is employed for sake of clarity. However, the present disclosure is not intended to be limited to the specific terminology so selected, and it is to be understood that each specific element includes all technical equivalents which operate in a similar manner.

While denial of service attacks can theoretically originate from within the local network where the targeted server is located, it is most common for denial of service attacks to be launched from beyond the local network, for example, from over the internet.

Computer networks often use a set of communications protocols to define how information is communicated within the network. Many networks, for example the internet, use the Transmission Control Protocol/Internet Protocol (TCP/IP) set of communications protocols. The most commonly used protocols within this set are the Transmission Control Protocol (TCP) and the Internet Protocol (IP). The TCP/IP protocol set communicates data along various layers of the computer network by breaking up data into discrete units of data called packets and communicating each unit of data individually in accordance with the protocols that form TCP/IP. The form of the packet that should be used depends on the protocols responsible for the particular layer of communication. Packets of data communicated by one protocol layer may be communicated via packets of data communicated by another protocol layer upon which the first protocol layer is built. For example, TCP/IP packets may be sent by application layer protocols. These protocols are generally concerned with how the user perceives the network.

Within the TCP/IP protocol set, the IP protocol is primarily responsible for the routing of data. Packets communicated by the IP protocol, may contain an IP header to facilitate packet routing. This header may be a set of information with a well defined structure that contains, for example, the address the packet is intended to be delivered to (destination address) and the address where the packet has originated from (source address).

The TCP protocol generally operates on top of the IP protocol and is primarily responsible for maintaining a reliable communication using measures to verify that packets have been correctly received. In networks employing the TCP/IP protocol set (TCP/IP networks), the IP header is generally followed by the TCP header to facilitate reliable communication. The TCP header may be a set of information with a well defined structure that contains information useful to the TCP protocol in maintaining reliable communication.

Figure 1:
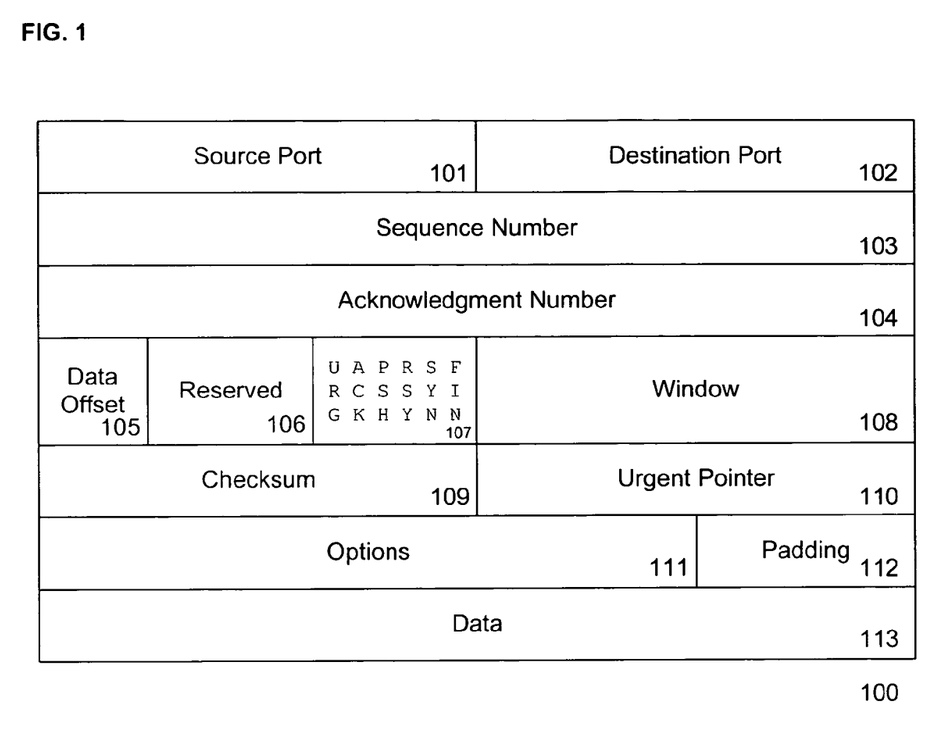
FIG. 1 shows the structure of a TCP header.

FIG. 1 shows the structure of the TCP header 100. A TCP header can be found in the beginning of each packet generated for communication by the TCP protocol (TCP packet). TCP packets are often called TCP segments and are an example of the category of packets referred to as datagrams. The TCP header is generally comprised of a series of 32-bit numbers often referred to as "words". As illustrated in FIG. 1, every row represents a single 32-bit word. Where a row is comprised of more than one section, as is the case with the row comprising the source port 101 and the destination port 102, each section represents a word of less than 32-bits and all of the sections of a row together add to 32-bits.

The source port number 101 is generally a 16-bit word indicating the port of communication used by the system that generated the packet. The destination port number 102 is generally a 16-bit word that indicates the port of communication used by the system that the packet is addressed to.

The sequence number 103 is generally a 32-bit word used to keep track of the correct order of the packets. The sequence number may begin as an initial sequence number (ISN). The ISN is generally a randomly generated number that can be used as the sequence number on the first TCP packet sent for a communication. Each subsequent TCP packet sent as part of the same communication uses a sequence number equal to the ISN plus the number of bytes that have so far been sent as part of the same communication.

The acknowledgement number 104 is generally a 32-bit number indicating the value of the next sequence number 103 the sender of the TCP packet is expecting to receive. The data offset 105 is generally a 4-bit number indicating the total size of the TCP header by indicating how many 32-bit words the TCP header is comprised of. The reserved space 106 is generally a 6-bit value reserved for future use. The reserve space 106 should be set at zero. The control bits 107 are generally comprised of 6 1-bit values (switches) where URG is generally the urgent pointer field significant switch, ACK is generally the acknowledgement field significant switch, PSH is generally the push function switch, RST is generally the reset the connection switch, SYN is generally the synchronize sequence numbers and FIN is generally the no more data from sender switch. The window 108 is generally a 16-bit number indicating the amount of data the sender of the TCP packet should be willing to accept. The checksum 109 is generally a 16-bit number that is generally used to ensure that the TCP header has been correctly received. The urgent pointer 110 is generally a 16-bit number that is generally used to point to urgent data. This field should only be used in TCP packets where the URG switch of the control bits 107 should be set to 1 (on). The options 111 may be an 8-bit word, a 16-bit word, a 24-bit word or a 32-bit word. Where the options 111 is less than a 32-bit word, padding 112 fills the remaining space on the 32-bit word with zeroes. The option 111 allows for additional TCP header features. The data field 113 is generally not part of the TCP header but instead shows where the data associated with the TCP packet begins. TCP packet data is generally comprised of a series of 32-bit words.

Embodiments of the present disclosure automatically analyze and block malicious packets of data that are determined to be part of a malicious attack, for example a denial of service attack so that the malicious packets can be prevented from reaching the device that has been targeted for attack (the targeted device).

Figure 2:
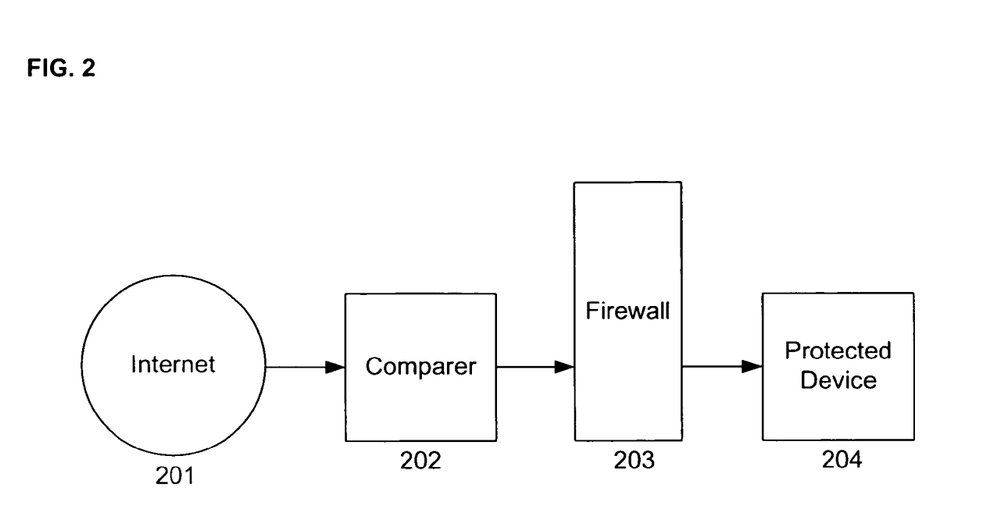
FIG. 2 shows how a device can be protected from malicious packets that form a denial of service attack according to embodiments of the present disclosure.

FIG. 2 shows how the targeted device can be protected from malicious packets that form a denial of service attack according to embodiments of the present disclosure. The protected device 204 may be, for example, a server hosting a website. Because the denial of service attack most likely arrives from the internet 201, a firewall 203 can be placed between the internet 201 and the protected device 204. A firewall 203 can be a device that can be programmed to reject (block) particular packets of data. The firewall 203 can be software running on a device, for example a computer, or it can be a dedicated hardware device. The firewall 203 can be programmed to block packets that have been determined to be part of a denial of service attack. The determination as to what packets are part of a denial of service attack can be made by a comparer 202 which analyzes packets according to embodiments of the present disclosure. After the comparer 202 has determined what packets are part of the attack, information concerning how to identify these malicious packets can be sent to the firewall 203 so that the malicious packets can be blocked from reaching the protected device 204. Comparer 202 can be a part of the firewall and as such can be software running on a device, for example a computer, or can be a dedicated hardware device.

Figure 3:
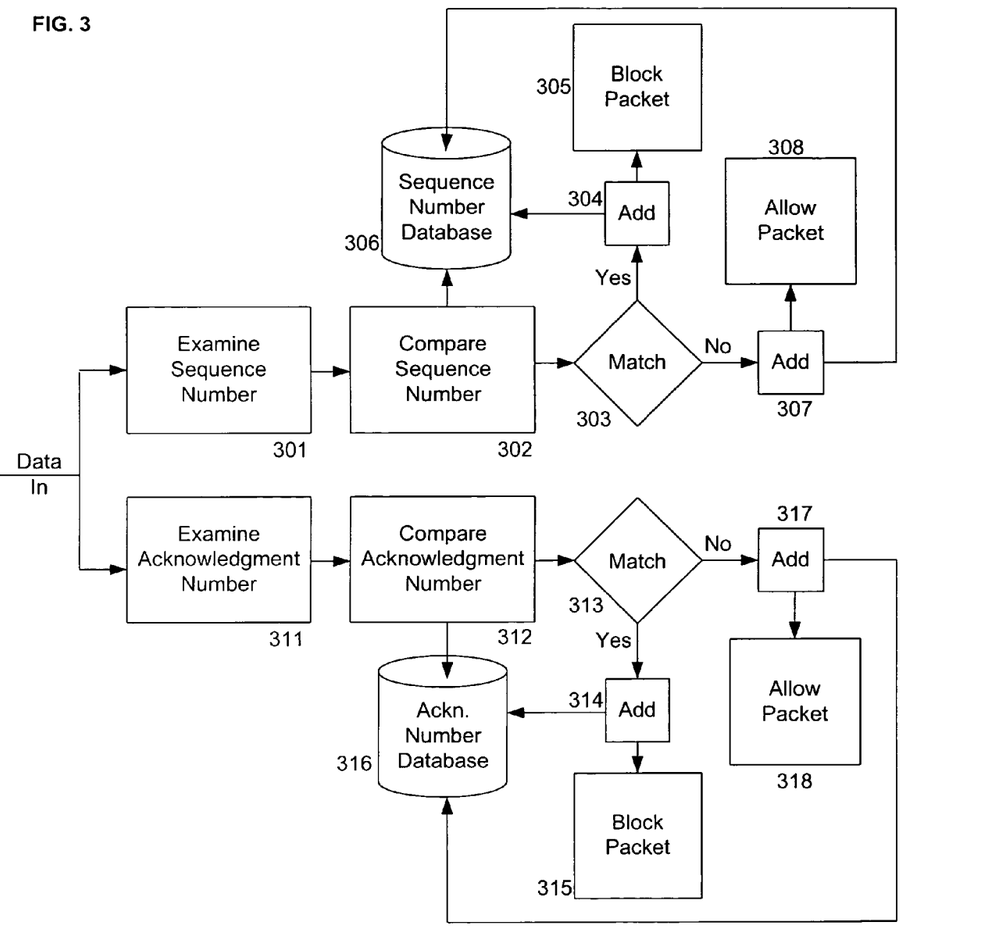
FIG. 3 shows a method by which packets can be analyzed and blocked when the packets are determined to be malicious according to an embodiment of the present disclosure.

FIG. 3 illustrates a method by which packets can be analyzed by the comparer 202 and blocked by the firewall 203 when the packets are determined to be malicious according to an embodiment of the present disclosure. According to an embodiment of the present disclosure, a determination can be made as to whether the data is part of a denial of service attack by examining the sequence number (Step S301) of the data and/or by examining the acknowledgement number (Step S311) of the data. This embodiment carries out two sets of method steps in parallel, one set of method steps relating to the sequence numbers of packets (Steps S301-S308) and the other set of method steps relating to acknowledgment numbers of packets (Steps S311-S318). According to an embodiment, a packet may be blocked based on the sequence number (Step S305), based on the acknowledgement number (Step S315) or based on both the sequence number and the acknowledgement number. Other embodiments of the present disclosure may use only the method steps relating to the sequence numbers (Steps S301-S308) to block packets. Other embodiments of the present disclosure may use only the method steps relating to the acknowledgement numbers (Step S311-S318) to block packets.

According to this embodiment of the present disclosure, data that is to be received by the protected device 204 via the internet 201 can be examined to ascertain the sequence number 103 (Step S301) of the TCP header 100 for each incoming TCP packet and/or to ascertain the acknowledgement number 104 (Step S311) of the TCP header 100 for each incoming TCP packet.

The sequence number 103 can then be compared against entries within a sequence number database 306 (Step S302). According to an embodiment of the present disclosure, the sequence number database stores the sequence numbers 103 of the most recent packets that have been previously examined. Comparing (Step S302) can be facilitated by the use of database search techniques, for example, a hash table. A hash table is an index that allows for quicker searching of the entries within the sequence number database 306 so that only the index needs be searched and not the database entries themselves.

The sequence number database 306 may store a fixed number of the most recent sequence numbers 103 detected. After the sequence number database 306 has been filled to capacity, room can be created for the next sequence number 103 by removing the oldest sequence number from the database 306. Therefore, the sequence number database can be a first-infirst-out (FIFO) array. For example, the oldest sequence number from the sequence database 306 can be replaced with the next sequence number 103 and the hash index can be changed to reflect the change of values.

Figure 4A:
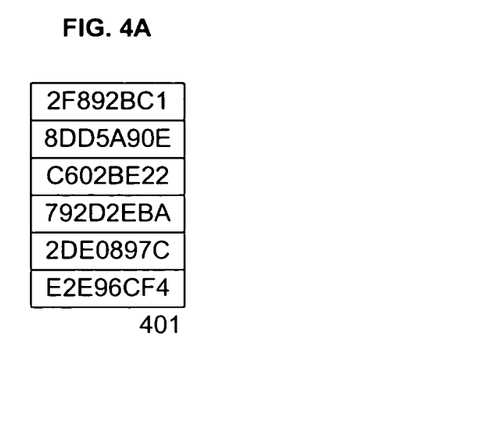
FIGS. 4A-4C show examples of a sequence number database according to an embodiment of the present disclosure.
Figure 4B:
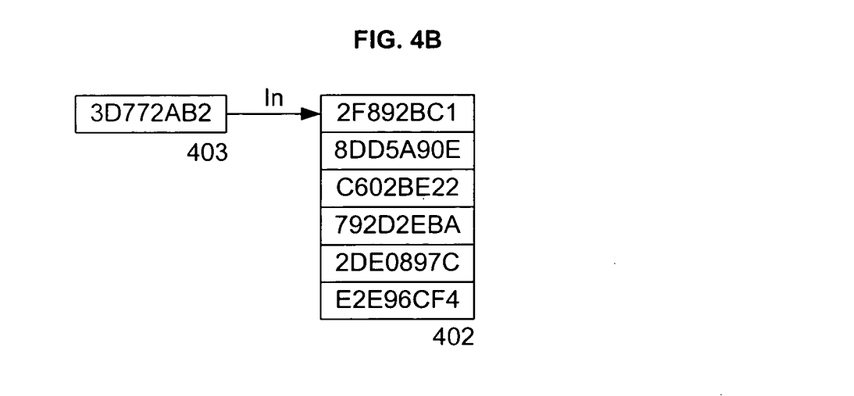
Figure 4C:
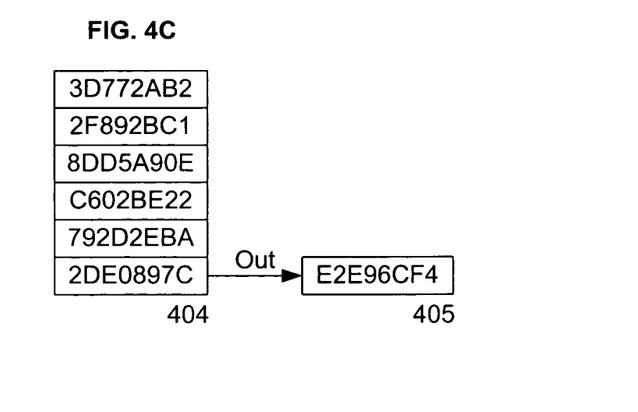

An example of a sequence number database 306 according to an embodiment of the present disclosure is illustrated in FIG. 4A-FIG. 4C. FIG. 4A shows an array of 6 32-bit words (shown in hexadecimal format for simplicity) forming an example sequence number database 401. Although this example only contains 6 entries, embodiments of the present disclosure may contain any number of entries. The 6 32-bit words represent the sequence numbers of the last 6 packets to be analyzed. FIG. 4B shows the next sequence number 403 to be added to the sequence number database 402. As shown in FIG. 4C, the next sequence number 403 can be added to the top of the sequence number database 404 thereby pushing out the oldest sequence number entry 405.

As described above, the sequence number 103 can either be a randomly generated 32-bit word (ISN) (when the TCP packet is the first TCP packet of a communication) or a number formed by adding the number of bytes transmitted to the ISN. The result is that the same 32-bit sequence number is likely to reoccur less frequently than once every four billion new communications. Therefore, even if the sequence number database 306 contains the last tens of thousands of sequence numbers 103 detected, the examined sequence number 103 should not match a sequence number stored in the sequence number database 306.

Many programs used to launch denial of service attacks are written to create the TCP header manually instead of relying on the TCP/IP protocols to generate random ISNs. Therefore, packets produced by denial of service attacks commonly contain identical sequence numbers 103. Therefore when the examined sequence number 103 is compared to the sequence numbers 103 in the sequence number database 306 (Step S302), sequence numbers 103 of the packets that are part of a denial of service attack will likely match a sequence number stored in the sequence number database 306.

Where the sequence number 103 of the packet does not match a sequence number 103 in the sequence number database 306 (No Step 303), the sequence number 103 of the packet can be added to the sequence number database 306 for the benefit of subsequent iterations of the instant method (Step S307). Such packets will be allowed to continue through the firewall 203 and to the protected device 264 (Step S308) provided the packet is not blocked as a result of the acknowledgment number method steps (Step S315) as described below.

Where the sequence number 103 of the packet matches a sequence number 103 in the sequence number database 306 (Yes Step 303), the sequence number 103 of the packet may be added to the sequence number database 306 (Step S304) so that protection from the denial of service attack can continue for as long as the attack is in progress. Such packets will be blocked by the firewall 203 and will therefore be prevented from reaching the protected device 204 (Step S305) regardless of whether the packet is blocked as a result of the acknowledgement number method steps (Step S315) as described below.

As stated above, according to the embodiment of the present disclosure shown in FIG. 3, the method steps relating to the sequence numbers of packets (Steps S301-S308) and the method steps relating to the acknowledgement numbers of packets (Steps S311-S318) can be carried out in parallel. Therefore, as the method steps relating to the sequence numbers of packets (Steps S301-S308) as described above are carried out, the acknowledgement number 104 can then be compared against each entry within an acknowledgement number database 316 (Step S312). The acknowledgement number database 316 stores the acknowledgement numbers 104 of the most recent packets that have been examined according to the present disclosure. Comparing (Step S312) can be facilitated by the use of database search techniques, for example, a hash table.

Because the acknowledgement number database 316 stores a fixed number of the most recent acknowledgement numbers 104 detected, after the acknowledgement number database 316 has been filled to capacity, room can be created for the next acknowledgement number 104 by removing the oldest acknowledgement number from the database 316. Therefore, the acknowledgement number database can be a first-in-first-out (FIFO) array. For example, the oldest acknowledgement number from the acknowledgement database 316 can be replaced with the next acknowledgement number 104 and the hash index can be changed to reflect the change of values.

As described above, the sequence number 103 can either be a randomly generated ISN or a sequential derivative of the ISN. As described above, the acknowledgement number 104 is also generally a sequential derivative of the ISN. Therefore, there is a similarly infinitesimal probability that two packets derived according to the TCP/IP protocol set would have identical acknowledgement numbers 104. Therefore, even if the acknowledgement number database 316 contains the last tens of thousands of acknowledgement numbers 104 detected, the examined acknowledgement number 104 should not match an acknowledgement number stored in the acknowledgement number database 316.

For the reasons stated above, packets produced by denial of service attacks commonly contain identical acknowledgement numbers 104. Therefore when the examined acknowledgement number 104 can be compared to the acknowledgement numbers 104 in the acknowledgement number database 316 (Step S312), acknowledgement numbers 104 of the packets that are part of a denial of service attack will likely match an acknowledgement number stored in the acknowledgement number database 316.

Where the acknowledgement number 104 of the packet does not match an acknowledgement number 104 in the acknowledgement number database 316 (No Step 313), the acknowledgement number 104 of the packet can be added to the acknowledgement number database 316 for the benefit of subsequent iterations of the instant method (Step S317). Such packets will be allowed to continue through the firewall 203 and onto the protected device 204 (Step S318) provided that the same packet was allowed with respect to its sequence number (Step S308) as described above.

Where the acknowledgement number 104 of the packet matches an acknowledgement number 104 in the acknowledgement number database 316 (Yes Step 313), the acknowledgement number 104 of the packet may be added to the acknowledgement number database 316 (Step S314) so that protection from the denial of service attack can continue for as long as the attack is in progress. Such packets will be blocked by the firewall 203 and will therefore be prevented from reaching the protected device 204 (Step S315) regardless of whether the packet is blocked as a result of the sequence number method steps (Step S305) as described above.

Figure 5:
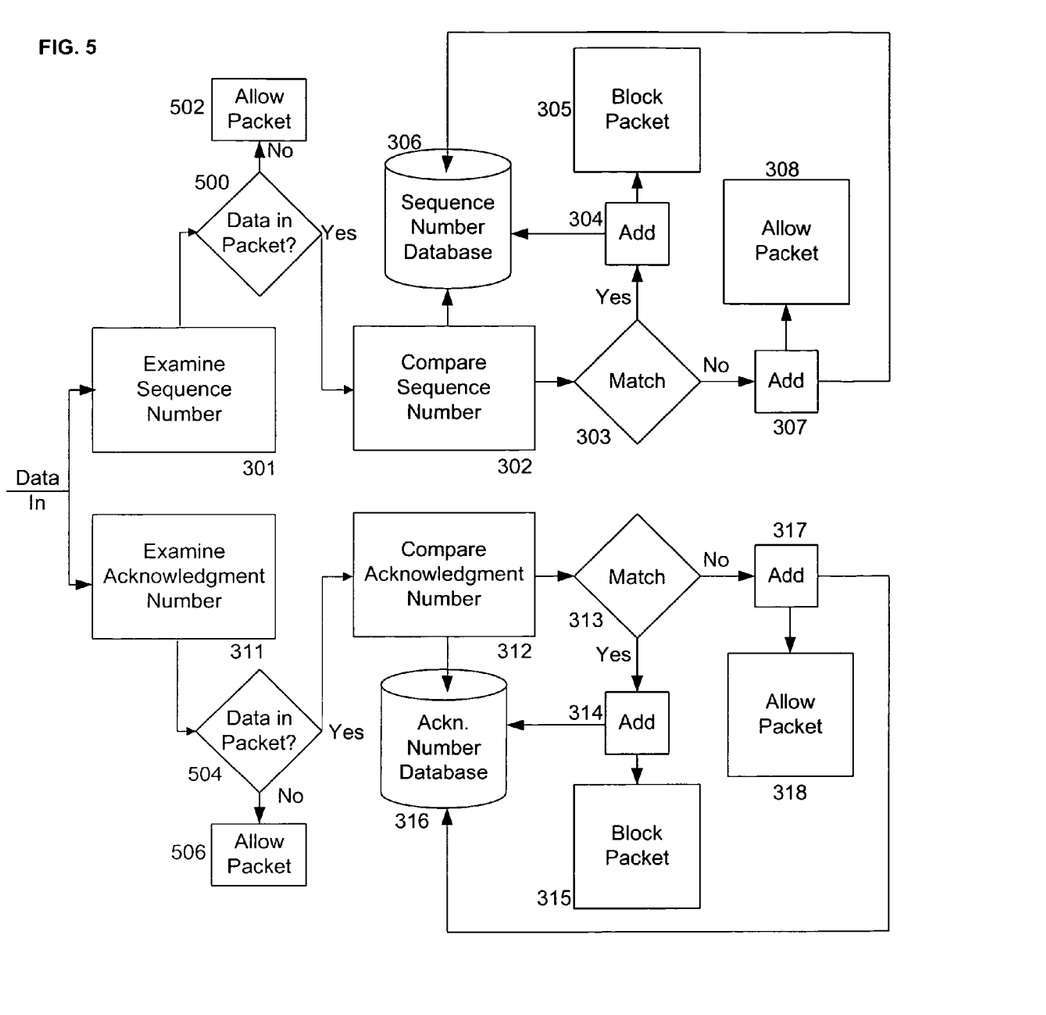
FIG. 5 shows a method by which packets can be analyzed and blocked when the packets are determined to be malicious according to another embodiment of the present disclosure.

It should be noted that the sequence number of a packet may be the same as a previous sequence number if the client did not send any data in the previous packet. Similarly, the acknowledgement number may be the same as a previous acknowledgement number if the server did not send any data in its previous packet. The following embodiment described by reference to FIG. 5, is similar to the embodiment described in FIG. 3. Like numbers represent the same or similar steps to those described above with reference to FIG. 3. Accordingly, not all steps in FIG. 5 will be described below. According to this embodiment of the present disclosure, after the sequence number is examined (Step S301), a determination is made whether there is data in the packet (Step S500). If there is data in the packet (Yes, Step S500), the sequence number is compared to the sequence numbers of the sequence number database 306 (Step S302) and the process continues as described above with reference to FIG. 3. If there is no data in the packet (No, Step S500), the packet is allowed to pass (Step S502). However, the sequence number is not added to the sequence number database. In a similar fashion, after the acknowledgement number is examined (Step S311), a determination is made whether there is data in the packet (Step S504). If there is data in the packet (Yes, Step S504), the acknowledgement number is compared to the acknowledgement numbers of the acknowledgement number database 306 (Step S312) and the process continues as described above with reference to FIG. 3. If there is no data in the packet (No, Step S504), the packet is allowed to pass (Step S506). However, the acknowledgement number is not added to the acknowledgement number database.

According to another embodiment, where the client did not send data to the server and only the SYN flag is set, the sequence number of the packet can be added to the sequence number database and the packet processed like the other packets. That is, the packet is allowed to pass only if the sequence number was not already in the database before the packet arrived.

Figure 6:
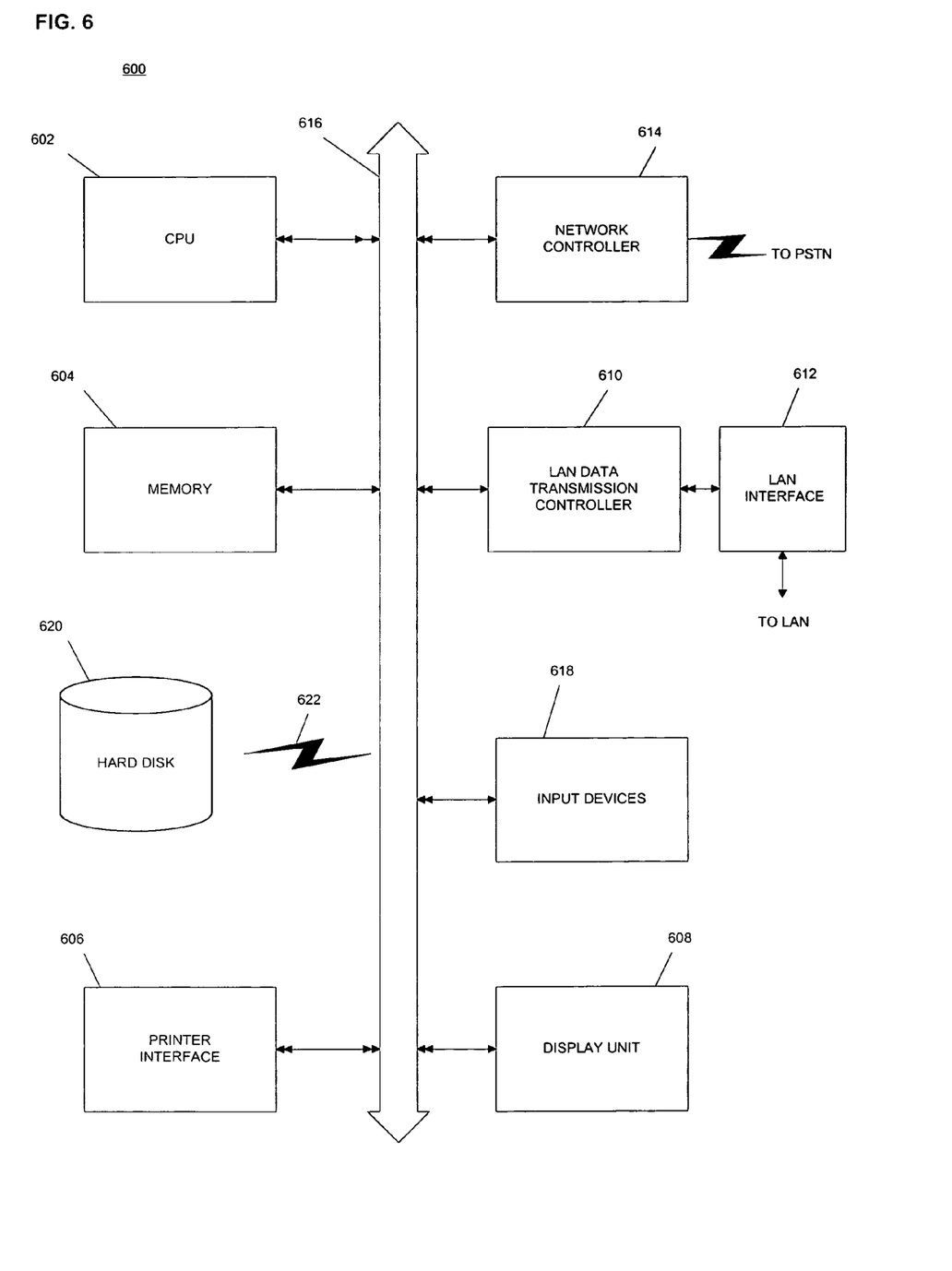
FIG. 6 shows an example of a computer system capable of implementing the method and apparatus according to embodiments of the present disclosure.

FIG. 6 shows an example of a computer system which may implement the method and system of the present disclosure. The system and method of the present disclosure may be implemented in the form of a software application running on a computer system, for example, a mainframe, personal computer (PC), handheld computer, server, etc. The software application may be stored on a recording media locally accessible by the computer system and accessible via a hard wired or wireless connection to a network, for example, a local area network, or the Internet.

The computer system referred to generally as system 600 may include, for example, a central processing unit (CPU) 602, random access memory (RAM) 604, a printer interface 606, a display unit 608, a local area network (LAN) data transmission controller 610, a LAN interface 612, a network controller 614, an internal buss 616, and one or more input devices 618, for example, a keyboard, mouse etc. As shown, the system 600 may be connected to a data storage device, for example, a hard disk, 620 via a link 622.

What is claimed is:

1. A method for detecting malicious packets, the method comprising:
   determining, using one or more processing units, whether a first input packet comprises data;
   determining, using one or more processing units, whether a second input packet comprises data;
   comparing, using the one or more processing units, a sequence number of said first input packet with sequence numbers of one or more previously input packets when it is determined that said first input packet comprises data;
   detecting, using one or more processing units, a malicious packet when said sequence number of said first input packet matches at least one of said sequence numbers of said one or more previously input packets; and
   allowing, using the one or more processing units, said second input packet to pass, without storing a sequence number of said second input packet in a database of sequence numbers of previously input packets and without comparing the sequence number of said second input packet with sequence numbers of one or more previously input packets, when it is determined that said second input packet does not comprise data.

2. The method according to claim 1, wherein the database of sequence numbers of previously input packets is used in comparing said sequence number of said first input packet with said sequence numbers of said one or more previously input packets and further comprising:
   adding said sequence number of said first input packet to said database of sequence numbers when it is determined that said first input packet comprises data.

3. The method according to claim 2, wherein said database of sequence numbers is a database of a fixed size such that when said database of sequence numbers is filled to capacity, adding said sequence number of said first input packet to said database of sequence numbers further comprises removing an oldest sequence number from said database of sequence numbers prior to adding said sequence number of said first input packet to said database of sequence numbers.

4. The method according to claim 2, further comprising:
   using a hash table in said comparing said sequence number of said first input packet with said sequence numbers of said one or more previously input packets.

5. The method according to claim 1, further comprising:
   blocking said detected malicious packet.

6. The method according to claim 5, wherein blocking said detected malicious packet comprises instructing a firewall to reject said detected malicious packets.

7. A system for detecting malicious packets, the system comprising:
   one or more memory devices; and
   one or more processing devices operable to:
      determine whether a first input packet comprises data;
      determine whether a second input packet comprises data;
      compare a sequence number of said first input packet with sequence numbers of one or more previously input packets when it is determined that said first input packet comprises data;
      detect a malicious packet when said sequence number of said first input packet matches at least one of said sequence numbers of said previously input packets; and
      allow said second input packet to pass, without storing a sequence number of said second input packet in a database of sequence numbers of previously input packets and without comparing the sequence number of said second input packet with sequence numbers of one or more previously input packets, when it is determined that said second input packet does not comprise data.

8. The system according to claim 7, wherein the database of sequence numbers of previously input packets is used in comparing said sequence number of said first input packet with said sequence numbers of said one or more previously input packets and the one or more processing devices are further operable to:
   add said sequence number of said first input packet to said database of sequence numbers when it is determined that said first input packet comprises data.

9. The system according to claim 8, wherein said database of sequence numbers is a database of a fixed size such that when said database of sequence numbers is filled to capacity, adding said sequence number of said first input packet to said database of sequence numbers further comprises removing an oldest sequence number from said database of sequence numbers prior to adding said sequence number of said first input packet to said database of sequence numbers.

10. The system according to claim 8, wherein said comparing unit uses a hash table when comparing said sequence number of said first input packet with said sequence numbers of said one or more previously input packets.

11. The system according to claim 7, wherein the one or more processing devices are further operable to:
   block said detected malicious packet.

12. The system according to claim 11, wherein the one or more processing devices are operable to block said detected malicious packet using a firewall which is instructed to reject said detected malicious packets.

13. A computer system comprising:
   a processor; and
   a computer recording medium including computer executable code executable by the processor for detecting malicious packets, the computer executable code comprising:
   code for determining whether a first input packet comprises data;
   code for determining whether a second input packet comprises data;
   code for comparing a sequence number of said first input packet with sequence numbers of one or more previously input packets when it is determined that said first input packet comprises data;
   code for detecting a malicious packet when said sequence number of said first input packet matches at least one of said sequence numbers of said previously input packets; and
   code for allowing said second input packet to pass, without storing a sequence number of said second input packet in a database of sequence numbers of previously input packets and without comparing the sequence numbers of one or more previously input packets, when it is determined that said second input packet does not comprise data.

14. The computer system according to claim 13, wherein the database of sequence numbers of previously input packets is used in comparing said sequence number of said first input packet with said sequence numbers of said one or more previously input packets and said code for detecting malicious packets further comprises:

code for adding said sequence number of said first input packet to said database of sequence numbers when it is determined that said first input packet comprises data.

15. The computer system according to claim 14, wherein said database of sequence numbers is a database of a fixed size such that when said database of sequence numbers is filled to capacity, said code for adding said sequence number of said first input packet to said database of sequence numbers additionally comprises code for removing an oldest sequence number from said database of sequence numbers prior to adding said sequence number of said first input packet to said database of sequence numbers.

16. The computer system according to claim 14, wherein said code for comparing uses a hash table when comparing said sequence number of said first input packet with said sequence numbers of said one or more previously input packets.

17. The computer system according to claim 13, further comprising code for blocking said detected malicious packet.

18. The computer system according to claim 17, wherein said code for blocking said detected malicious packet comprises code for instructing a firewall to reject said detected malicious packets.

19. A non-transitory computer recording medium including computer executable code for detecting malicious packets, the computer executable code comprising:
   code for determining whether a first input packet comprises data;
   code for determining whether a second input packet comprises data;
   code for comparing a sequence number of said first input packet with sequence numbers of one or more previously input packets when it is determined that said first input packet comprises data;
   code for detecting a malicious packet when said sequence number of said first input packet matches at least one of said sequence numbers of said one or more previously input packets; and
   code for allowing said second input packet to pass, without storing a sequence number of said second input packet in a database of sequence numbers of previously input packets and without comparing the sequence numbers of one or more previously input packets, when it is determined that said second input packet does not comprise data.

* * * * *